(12) United States Patent
Baldwin et al.

(10) Patent No.: US 9,298,385 B2
(45) Date of Patent: Mar. 29, 2016

(54) SYSTEM, METHOD AND COMPUTER PROGRAM PRODUCT FOR DEDUPLICATION AWARE QUALITY OF SERVICE OVER DATA TIERING

(71) Applicant: International Business Machines Corporation, Armonk, NY (US)

(72) Inventors: Duane M. Baldwin, Mantorville, MN (US); Sasikanth Eda, Krishna (IN); Deepak R. Ghuge, Ahmednagar (IN); John T. Olson, Tuscon, AZ (US); Sandeep R. Patil, Pune (IN)

(73) Assignee: International Business Machines Corporation, Armonk, NY (US)

( * ) Notice: Subject to any disclaimer, the term of this patent is extended or adjusted under 35 U.S.C. 154(b) by 246 days.

(21) Appl. No.: 13/862,270

(22) Filed: Apr. 12, 2013

(65) Prior Publication Data

US 2014/0310455 A1 Oct. 16, 2014

(51) Int. Cl.
*G06F 12/00* (2006.01)
*G06F 3/06* (2006.01)
*G06F 12/02* (2006.01)

(52) U.S. Cl.
CPC .............. *G06F 3/0641* (2013.01); *G06F 3/067* (2013.01); *G06F 3/0608* (2013.01); *G06F 3/0649* (2013.01); *G06F 3/0685* (2013.01); *G06F 12/00* (2013.01)

(58) Field of Classification Search
CPC ........................................................ G06F 12/00
USPC .......................................................... 711/154
See application file for complete search history.

(56) References Cited

U.S. PATENT DOCUMENTS

| | | | |
|---|---|---|---|
| 7,567,188 B1 * | 7/2009 | Anglin et al. | 341/63 |
| 7,672,981 B1 | 3/2010 | Faibish et al. | |
| 7,822,939 B1 | 10/2010 | Veprinsky et al. | |
| 8,285,681 B2 | 10/2012 | Prahlad et al. | |
| 8,949,208 B1 * | 2/2015 | Xu et al. | 707/698 |
| 2010/0332401 A1 * | 12/2010 | Prahlad et al. | 705/80 |
| 2010/0333116 A1 | 12/2010 | Prahlad et al. | |
| 2012/0117029 A1 * | 5/2012 | Gold | 707/651 |
| 2013/0042083 A1 * | 2/2013 | Mutalik et al. | 711/162 |
| 2013/0067595 A1 * | 3/2013 | Pierre et al. | 726/28 |

* cited by examiner

*Primary Examiner* — Tuan Thai
*Assistant Examiner* — Gautam Sain
(74) *Attorney, Agent, or Firm* — Zilka-Kotab, PC

(57) ABSTRACT

A method for ensuring compliance of service levels corresponding to file-system operations in a deduplicated, tiered storage system comprising storage devices of varying performance levels, each of the performance levels being associated with at least one service level, includes performing a deduplication remapping operation so that a data item corresponding to a higher service level, is stored as an original on a higher performance storage tier while duplicates of the data item corresponding to a lower service level exist in lower performance storage tier at least in part as pointers to the data item on the higher performance storage tier.

17 Claims, 8 Drawing Sheets

SYSTEM, METHOD AND COMPUTER PROGRAM PRODUCT FOR DEDUPLICATION AWARE QUALITY OF SERVICE OVER DATA TIERING

BACKGROUND

The present invention relates to tiered data storage, and more particularly, this invention relates to deduplication-aware quality of service (QoS) for data in tiered storage systems and networks including cloud-based environments.

Information Life Cycle Management (ILM) includes strategic policies and processes for effective management of information stored in a storage system. For example ILM may include an automatic storage tiering policy which facilitates automatic movement of data items across different tiers of storage media depending on different types of disk, e.g., according to performance and/or capacity requirements. Moreover, deduplication includes techniques to eliminate the storage of duplicate copies of data on a storage system, by comparing chunks and/or entire data items contents among multiple tiers and mapping a pointer to the location of the original data item at the duplicated location.

BRIEF SUMMARY

A method for ensuring compliance of service levels corresponding to file-system operations in a deduplicated, tiered storage system comprising storage devices of varying performance levels, each of the performance levels being associated with at least one service level is provided according to one embodiment. The method includes performing a deduplication remapping operation so that a data item corresponding to a higher service level, is stored as an original on a higher performance storage tier while duplicates of the data item corresponding to a lower service level exist in lower performance storage tier at least in part as pointers to the data item on the higher performance storage tier.

A computer program product according to one embodiment includes a computer readable storage medium having program code embodied therewith. The program code is readable/executable by a processor to perform a deduplication remapping operation so that a data item corresponding to a higher service level, is stored as an original on a higher performance storage tier while duplicates of the data item corresponding to a lower service level exist in lower performance storage tier at least in part as pointers to the data item on the higher performance storage tier.

A system according to one embodiment includes a processor and logic integrated with and/or executable by the processor, the logic is adapted to perform a deduplication remapping operation so that a data item corresponding to a higher service level, is stored as an original on a higher performance storage tier while duplicates of the data item corresponding to a lower service level exist in lower performance storage tier at least in part as pointers to the data item on the higher performance storage tier.

Other aspects and embodiments of the present invention will become apparent from the following detailed description, which, when taken in conjunction with the drawings, illustrate by way of example the principles of the invention.

DETAILED DESCRIPTION

Figure 1:
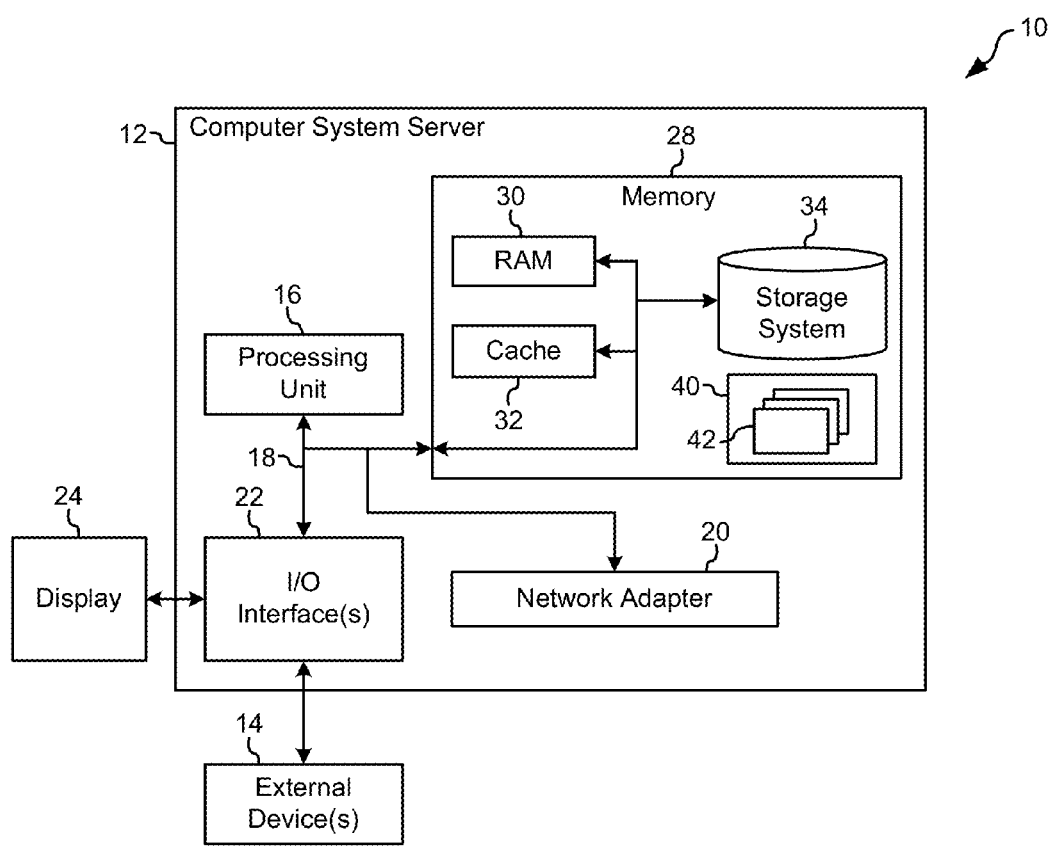
FIG. 1 depicts a cloud computing node, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of A policy engine or method for public cloud storage environments that takes into account the user's service level agreement and analyzes deduplicated and original files entries and performs a remapping operation as necessary to ensure that customers paying for a higher service level obtain higher speed access even though the file object forms a duplicate entry for a file originally stored on lower speed access.

In one general embodiment, a method is provided for ensuring compliance of service levels corresponding to file-system operations in a deduplicated, tiered storage system comprising storage devices of varying performance levels, each of the performance levels being associated with at least one service level. The method includes performing a deduplication remapping operation so that a data item corresponding to a higher service level, is stored as an original on a higher performance storage tier while duplicates of the data item corresponding to a lower service level exist in lower performance storage tier at least in part as pointers to the data item on the higher performance storage tier.

In another general embodiment, a computer program product includes a computer readable storage medium having program code embodied therewith. The program code is readable/executable by a processor to perform a deduplication remapping operation so that a data item corresponding to a higher service level, is stored as an original on a higher performance storage tier while duplicates of the data item corresponding to a lower service level exist in lower performance storage tier at least in part as pointers to the data item on the higher performance storage tier.

In yet another general embodiment, a system includes a processor and logic integrated with and/or executable by the processor, the logic is adapted to perform a deduplication remapping operation so that a data item corresponding to a higher service level, is stored as an original on a higher performance storage tier while duplicates of the data item corresponding to a lower service level exist in lower performance storage tier at least in part as pointers to the data item on the higher performance storage tier.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing and/or storage environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
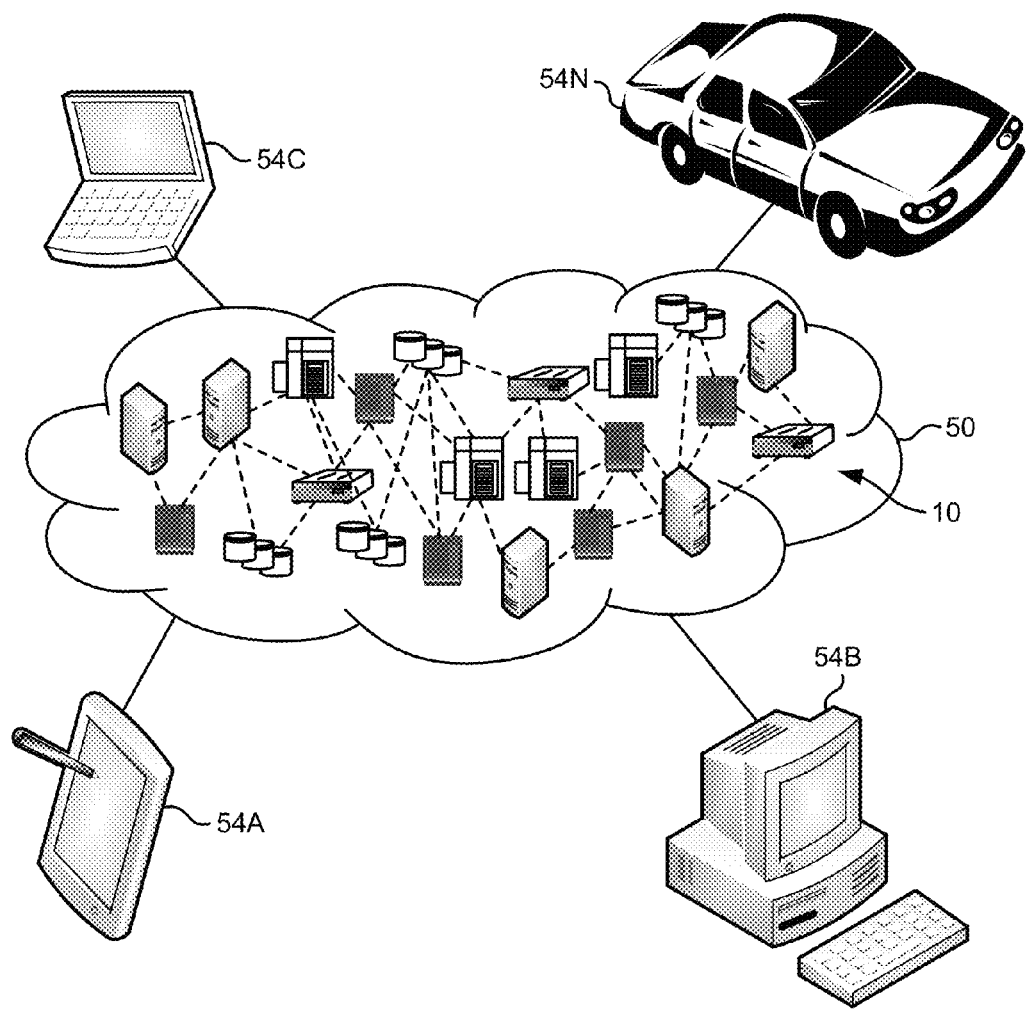
FIG. 2 depicts a cloud computing environment, according to one embodiment.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
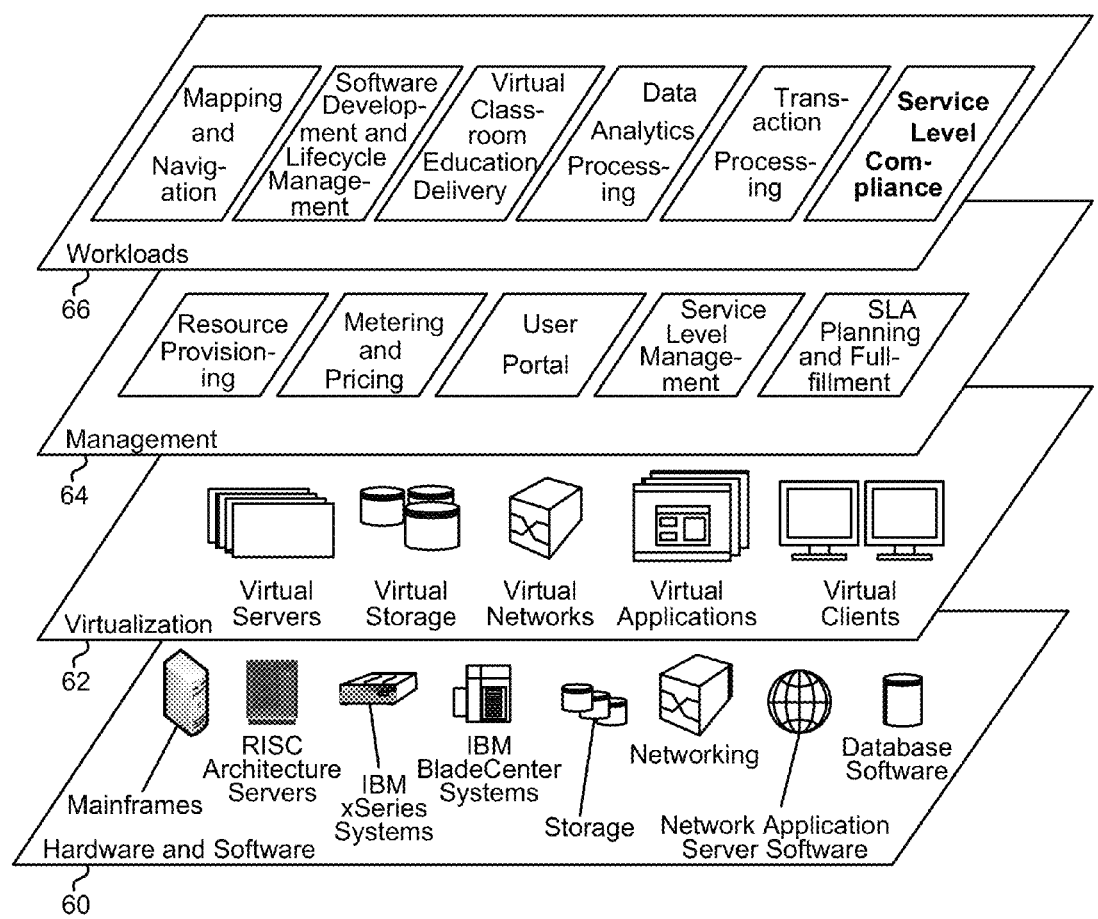
FIG. 3 depicts abstraction model layers, according to one embodiment.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. Service level management and/or SLA may include service level compliance functionality as described herein.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; service level compliance; etc.

Figure 4:
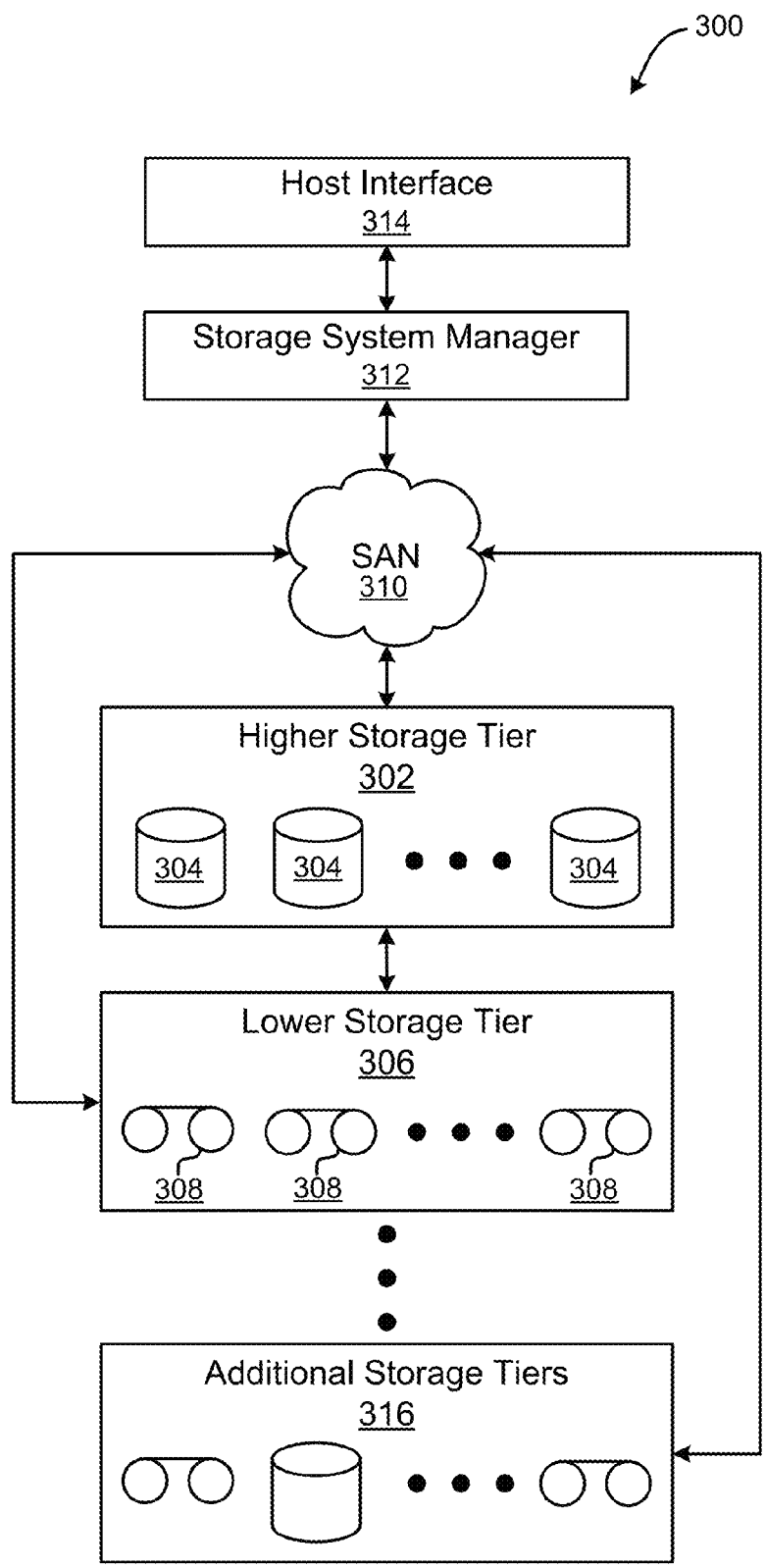
FIG. 4 illustrates a tiered data storage system in accordance with one embodiment.

Now referring to FIG. 4, a storage system 300 is shown according to one embodiment. Note that some of the elements shown in FIG. 4 may be implemented as hardware and/or software, according to various embodiments. The storage system 300 may include a storage system manager 312 for communicating with a plurality of media on a higher storage tier 302 and a lower storage tier 306. The higher storage tier 302 preferably may include one or more random access and/or direct access media 304, such as hard disks in hard disk drives (HDDs), nonvolatile memory (NVM), solid state memory in solid state drives (SSDs), etc., and/or others noted herein. The lower storage tier 306 may preferably include one or more sequential access media 308, such as magnetic tape in tape drives, optical media, etc., and/or others noted herein. Additional storage tiers 316 may include any combination of storage memory media. The storage system manager 312 may communicate with the storage media 304, 308 on the higher and lower storage tiers 302, 306 through a network 310, such as a storage area network (SAN), as shown in FIG. 4. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, Flash drives, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic adapted to receive a request to open a data set, logic adapted to determine if the requested data set is stored to a lower storage tier 306 of a tiered data storage system 300 in multiple associated portions, logic adapted to move each associated portion of the requested data set to a higher storage tier 302 of the tiered data storage system 300, and logic adapted to assemble the requested data set on the higher storage tier 302 of the tiered data storage system 300 from the associated portions.

Of course, this logic may be implemented as a method on any device and/or system or as a computer program product, according to various embodiments.

As described above, ILM includes strategic policies and processes for effective management of information stored in a storage system. For example ILM may include an automatic storage tiering policy which facilitates automatic movement of data items across different tiers of storage media depending on different types of disk, e.g., according to performance and/or capacity requirements. Moreover, deduplication includes techniques to eliminate the storage of duplicate copies of data on a storage system, by comparing chunks and/or entire data items contents among multiple tiers and mapping a pointer to the location of the original data item at the duplicated location (described in further detail below).

Both ILM and deduplication have become important factors of cloud storage systems. Policies embedded in the management stack utilize the clustered storage system (e.g., where the ILM engine resides) and deduplication engine (e.g., tied to the storage system) to decide the placement of files and pointers, e.g., references, on such storage systems. However, conventional products have been unable to successfully use ILM and deduplication in public cloud heterogeneous storage systems.

Public cloud storage systems are a platform type which may be accessible to multiple customers, e.g., people, companies, users, etc., whereas private cloud storage systems are accessible to a single customer, e.g., person, company, user, etc. As a result, in public cloud storage systems, multiple customers are sharing the same infrastructure, which gives rise to different QoS plans based on back end storage disk type, network utilization, etc. However, conventional products fail to provide accurate QoS to different customers within public cloud storage systems, because the ILM has limited control on placement decisions made by the deduplication engine.

Thus, in a tiered approach where one customer pays for a higher level of service than another customer, conventional products violate data consistency principles and fail to sustain effective tiered QoS for public cloud storage systems. As a result, it is desirable to provide a public cloud storage system that may successfully implement ILM and deduplication therein according to a customer's particular level of service. In sharp contrast to the conventional products, various embodiments described and/or suggested herein, preferably implement effective QoS behavior in the management stack (i.e., ILM), e.g., by considering deduplication and/or heterogeneous storage units.

Figure 5:
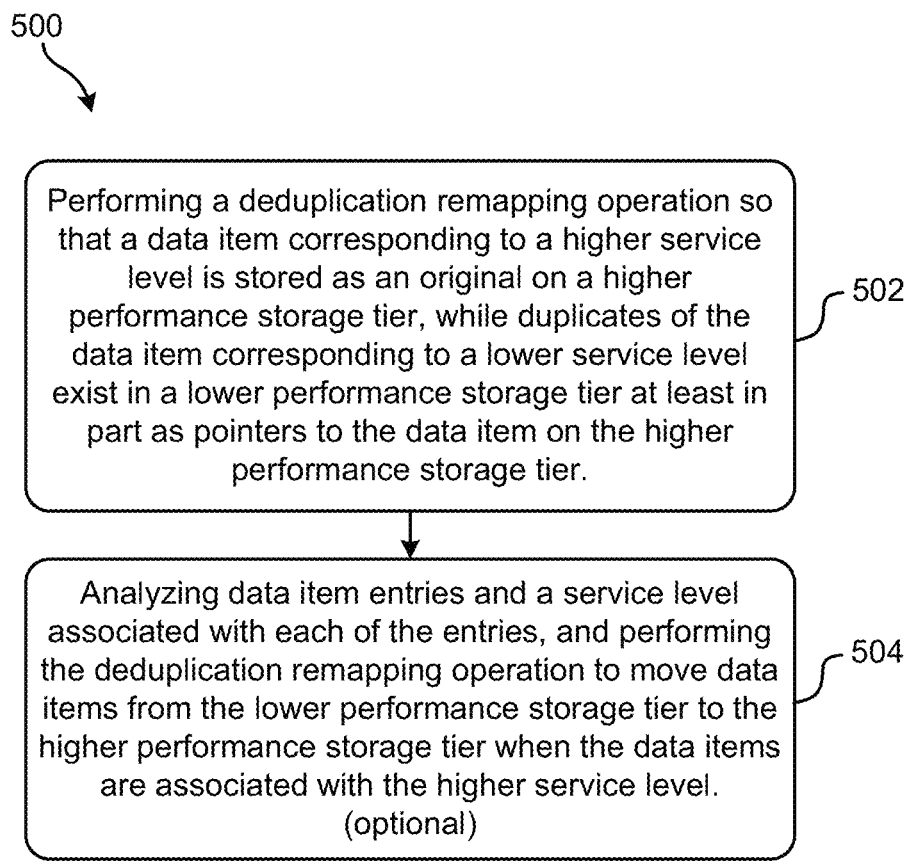
FIG. 5 illustrates a flowchart of a method according to one embodiment.

FIG. 5 depicts a method 500 for ensuring compliance of service levels corresponding to file-system operations (e.g., reading and/or writing) in a deduplicated, tiered storage system, in accordance with one embodiment. The method 500 additionally utilizes storage devices of varying performance levels, each of the performance levels preferably being associated with at least one service level.

As an option, the present method 500 may be implemented in conjunction with features from any other embodiment listed herein, such as those described with reference to the other FIGS. Of course, however, such method 500 and others presented herein may be used in various applications and/or in permutations which may or may not be specifically described in the illustrative embodiments listed herein. Further, the method 500 presented herein may be used in any desired environment.

With reference now to FIG. 5, the method 500 includes performing a deduplication remapping operation so that a data item corresponding to a higher service level is stored as an original on a higher performance storage tier, while duplicates of the data item corresponding to a lower service level exist in lower performance storage tier at least in part as pointers to the data item on the higher performance storage tier. See operation 502. With reference to the present description, "lower performance storage tier" is meant to be relative to the higher performance storage tier, but is in no way intended to limit the invention.

According to different approaches, performance may refer at least in part to a relative speed with which the data is returned to a user, a relative speed with which the data can be downloaded or uploaded by a user, etc., depending on the desired embodiment. Moreover, in various approaches, the data item may include any type of data such as a file, a portion of a file (also referred to as a "chunk" or block), a data object, metadata, etc.

Moreover, in a preferred approach, the tiered storage system gathers the deduplication information, original file location, content, size, deduplicated file location, etc., e.g., for the deduplication remapping operation. Thus, the gathered information may form a relational set association among the original and mapped deduplicated files, along with their locations. According to one approach, the gathered information may be stored in a set relation table (e.g., a lookup table), but is not limited thereto.

With continued reference to FIG. 5, the method 500 may optionally include analyzing data item entries and a service level associated with each of the entries, and performing the deduplication remapping operation to move data items from the lower performance storage tier to the higher performance storage tier when the data items are associated with the higher service level. See optional operation 504.

However, according to one approach, if an incoming data item corresponding to a higher service level does not form a duplicate to any data item stored on the lower data performance storage tier, the data item may be stored on the higher data performance storage tier, e.g., as an original. Moreover, in another approach, if an incoming data item corresponding to a lower service level does not form a duplicate to any data item stored on the higher data performance storage tier, the data item may be stored on the lower data performance storage tier, e.g., as an original.

In one approach, a data item may correspond to a higher service level because it is associated with and/or received from a customer subscribing to the higher service level. However, in other approaches, a data item may correspond to a higher service level because it contains important information, it is a first and/or only copy, it meets a threshold size (e.g., requires a certain amount of memory space), etc. Moreover, the higher service level may be associated with a higher cost to the customer than the lower service level. Such cost may be in terms of, for example, an average or minimum data transfer rate, a fixed amount of storage (e.g., 1 TB of storage on a particular service level for $X), a cost per unit storage (e.g., $X per GB of data stored), an amount of bandwidth used, a periodic fee (e.g., $X per month), etc. and combinations thereof. Of course, according to various embodiments, cost and pricing may be in any known manner as would be understood by one skilled in the art upon reading the present disclosure.

In another approach, the higher performance storage tier may include higher performance storage devices, e.g., than storage devices of the lower performance storage tier. For example, the higher performance storage tier may be akin to the higher storage tier 302 of FIG. 4, while the lower performance storage tier may be more akin to the lower storage tier 306 of FIG. 4.

In an exemplary use embodiment, which is in no way intended to limit the invention, Client-X has opted for a Bronze service plan (a lower service level than Gold) and Client-Y has opted for Gold service plan (a higher service level than Bronze) in a deduplicated, heterogeneous tiered storage system. It follows that Client-X's data items are to be stored on SATA memory (e.g., a lower performance storage tier) and Client-Y's data items are to be stored on SSD memory (e.g., a higher performance storage tier). Thus, a deduplication remapping operation of the tiered storage system may receive a new incoming say "File-Y" from Client-Y (e.g., a data item corresponding to a higher service level) which forms duplicate entry to a file already stored by Client-X, and as a result, the deduplication operation may store File-Y referenced to File-X in the SATA memory. The deduplication remapping operation preferably identifies and marks "File-Y" on the SSD memory as an original, e.g., to prevent data on the higher data performance storage tier from being mapped to (e.g., limited to the performance of) the lower data performance storage tier of a Bronze service plan, as will be discussed in further detail below.

As described above, data items corresponding to a higher service level are preferably stored in the higher performance storage tier as an original data entry, e.g., to prevent data items corresponding to the higher service level from being stored as references to a duplicate data item on a lower performance storage device. This allows data of a higher service level to maintain access to its intended QoS while ensuring the deduplication of data stored among the different performance storage tiers.

However, as described above, with reference to FIG. 5, the deduplication remapping operation may additionally determine whether a duplicate of a data item in a higher performance storage tier is present in the lower performance storage tier. If it is determined that a duplicate of the original data item is present in the lower performance storage tier, the deduplication remapping operation preferably maps at least a portion of the duplicate data item to the stored data item on the higher performance storage tier. Thus, although the data item in a lower performance storage tier was intended for a lower service level (e.g., QoS), the owner of the data item gains access to the higher service level of the higher performance storage tier, for that data item, by virtue of the data item being mapped thereto. In different approaches, the deduplication remapping operation may determine whether a duplicate of a data item is present in the lower performance storage tier before and/or after the data item is stored in the higher performance storage tier.

In an exemplary use embodiment, which is in no way intended to limit the invention, Client-X has opted for a Bronze service plan (a lower service level) and Client-Y has opted for Gold service plan (a higher service level) in a deduplicated, tiered storage system. "File-Y" from Client-Y is received and stored in the higher performance storage tier; however, a duplicate of "File-Y" already exists on a lower performance storage tier, e.g., as an original. Therefore, the deduplication remapping operation of the tiered storage system maps the duplicate data item on the lower performance storage tier to the stored data item on the higher performance storage tier, and deletes the duplicate part from the lower performance storage tier, thereby deduplicating the data item. As explained above, this allows Client-X to gain access to the Gold service plan, i.e., the higher service level, for the portion of the data item corresponding to the pointer, although Client-X has only opted for the Bronze service plan, i.e., the lower service level.

Similarly, in another exemplary use embodiment, which is in no way intended to limit the invention, Client-X has opted for a Bronze service plan (a lower service level) and Client-Y has opted for Gold service plan (a higher service level) in a deduplicated, tiered storage system. A data item ("File-Y") from Client-Y is stored in the higher performance storage tier as an original; however, "File-X" (a duplicate of "File-Y") is an incoming duplicate data item to be stored on lower performance storage tier. Therefore, the deduplication remapping operation of the tiered storage system maps File-X to File-Y from the lower performance storage tier to the higher performance storage tier, thereby deduplicating the data item. As explained above, this allows Client-X to gain access to the Gold service plan, i.e., the higher service level, for a portion of the data item although Client-X has only opted for the Bronze service plan, i.e., the lower service level.

According to yet another illustrative embodiment, a deduplicated, tiered storage system may have a data item on the higher performance tier (e.g., the original data item) and a duplicate thereof on the lower performance storage tier with pointers mapped to the original data item. In one approach, a deduplication remapping operation may receive a modification to the data item on the higher performance storage tier. According to various other approaches, the modification may include an insertion, partial deletion, total deletion, integration, etc. of the data item. Moreover, in different approaches, the modification may be received from a user, a computing device, computer program code, etc.

The deduplication remapping operation may additionally store the modified data item as a new data item on the higher performance storage tier. Moreover, the deduplication remapping operation may transfer the original version of the data item (i.e., before the modification) from the higher performance storage tier to the lower performance storage tier. Thus, the transferred original version of the data item from the higher performance storage tier may replace the duplicate, having pointers, on the lower performance storage tier. The deduplication remapping operation may also preferably delete the original version of the data item from the higher performance storage tier after the transferring thereof, e.g., to ensure deduplication and an efficient use of the storage tiers.

In an exemplary use embodiment, which is in no way intended to limit the invention, an original data item (e.g., owned by Client-Y) on the higher performance storage tier may have a duplicate data item (e.g., owned by Client-X) on a lower performance storage tier. Furthermore, the original data item may be modified. As a result, the deduplication remapping operation preferably saves the modified copy of the original data item as a new data item (still owned by Client-Y), and the original data item may remain on the higher performance storage tier for a period of time, which may be predetermined, based on workload, etc. Thus, the duplicate data item on the lower performance storage tier may still point to the original data item on the higher performance storage tier. Furthermore, the deduplication remapping operation preferably makes an entry of this data item to the relational set, enables direct saving of the modified copy of the original data item, performs a scheduled transfer of the original data item to the duplicated location (i.e. lower performance storage tier in this case) at a statistically identified low load time, etc., but is not limited thereto.

In another illustrative embodiment, a deduplication remapping operation may include detecting a request from a user for deletion of a data item from the higher performance storage tier of a deduplicated, tiered storage system. In different approaches, the deletion may include a partial deletion, the deletion of an entire data item, etc. Thus, the deduplication remapping operation may then represent to the user that the data item has been deleted e.g., by removing the data item from the user's directory of files, but is not limited thereto.

Moreover, if the data item has a duplicate on the lower performance storage tier, it is preferable that the deduplication remapping operation transfer the data item (i.e., requested to be deleted from the higher performance storage tier, to the lower performance storage tier, thereby replacing the duplicate having the pointers. The deduplication remapping operation may also preferably delete the data item from the higher performance storage tier after the transferring thereof, e.g., to ensure deduplication and an efficient use of the storage tiers.

In an exemplary use embodiment, which is in no way intended to limit the invention, "File-Y" from Client-Y is stored in the higher performance storage tier as an original; and a duplicate ("File-X") of "File-Y" exists on a lower performance storage tier, and is mapped to "File-Y". Client-Y may delete a portion and/or the entirety of "File-Y", thereby causing the deduplication remapping operation to delete the portion and/or the entirety of "File-Y" from the storage system. The deduplication remapping operation may delete the inode of this particular portion and/or the entirety of "File-Y" (e.g., so it may no longer be visible to the Client-Y).

As a result, the deduplicated entry of this data item will still be able to access this original data item. According to a preferred approach, if no other high-speed links exist, the deduplication remapping operation marks a flag for the data item and initiates a scheduled transfer of the original (deleted) "File-Y" to the duplicated location (lower performance storage tier), e.g., preferably at a statistically identified low load time, but is not limited thereto.

According to another illustrative embodiment, a deduplication remapping operation may include receiving a modification to a duplicate data item on the lower performance storage tier of a deduplicated, tiered storage system. The deduplication remapping operation may also include storing the modification on the lower performance storage tier. As described above, according to various approaches, the modification may include an insertion, partial deletion, total deletion, integration, etc. of the data item. Moreover, in different approaches, the modification may be received from a user, a computing device, computer program code, etc.

The deduplication remapping operation preferably includes transferring portions of the data item on the higher performance storage tier that correspond to unmodified portions of the duplicate data item to the lower performance storage tier. The deduplication remapping operation also preferably includes storing the portions in association with the modification as a new data item on the lower performance storage tier. The new data item may include the modification, and may or may not include pointers to data on the higher performance storage tier.

In an exemplary use embodiment, which is in no way intended to limit the invention, a data item stored on the higher performance storage tier may be an original copy of the data item, in addition to having a duplicate data item on the lower performance storage tier, mapped thereto, e.g., using pointers. If the duplicate data item is modified, the deduplication remapping operation preferably saves the modified copy of the original data item as a new data item, e.g., on the higher performance storage tier, while the original data item also remains on the higher performance storage tier, at least for some time period. As a result, the duplicate data item on the lower performance storage tier is still mapped to the original data item on the higher performance storage tier. Moreover, the deduplication remapping operation may additionally make an entry of this data item to the relational set, enable direct saving of the modified data item, perform a scheduled transfer of the modified data item to the duplicated location (on the lower performance storage tier), etc., preferably at a statistically identified low load time.

Moreover, in various approaches, the embodiments described and/or suggested herein may be implemented in storage systems already having multiple copies of a data item on different tiers of the storage system. This may preferably deduplicate the multiple copies of the data item on such storage systems, thereby increasing available memory, increasing efficiency of data retrieval, etc.

In an exemplary use embodiment, which is in no way intended to limit the invention, a data item owned by Client-X (e.g., stored on the lower performance storage tier) may be an original copy of the data item, in addition to having a duplicate data item on the higher performance storage tier being mapped thereto, e.g., using pointers. If the original data item is modified, the deduplication remapping operation preferably saves the modified copy of the original data item as a new data item, e.g., on the lower performance storage tier, while the original data item also remains on the lower performance storage tier. As a result, the duplicate data item on the higher performance storage tier will still be mapped to the original data item on the lower performance storage tier. Moreover, the deduplication remapping operation may additionally make an entry of this data item to the relational set, enable direct saving of the modified data item, perform a scheduled transfer of the previous version of the original data item to the higher performance storage tier, etc., preferably at a statistically identified low load time.

In another exemplary use embodiment, which is in no way intended to limit the invention, assume that an original data item owned by Client-X exists on a lower performance storage tier, and a duplicate entry of the same data item on a higher performance storage tier, owned by Client-Y, is mapped/pointing to the original data item on the lower performance storage tier. Suppose the duplicated data item (owned by Client-Y) is modified. The deduplication engine saves the modified copy as a new data item on the lower performance storage tier and the previous original data item also remains on the lower performance storage tier. In other words, the duplicate data item on the higher performance storage tier points to the latest version of the modified original data item on the lower performance storage tier. The deduplication remapping operation makes an entry of the modified data item to the relational set, enables direct saving of the modified data item and performs a scheduled transfer of the latest version of the modified file to the duplicated location (higher performance storage tier) at a statistically identified low load time. Note, this scenario assumes traditionally deduplicated data was already stored before the operations mentioned in this paragraph were performed.

Figure 6A:
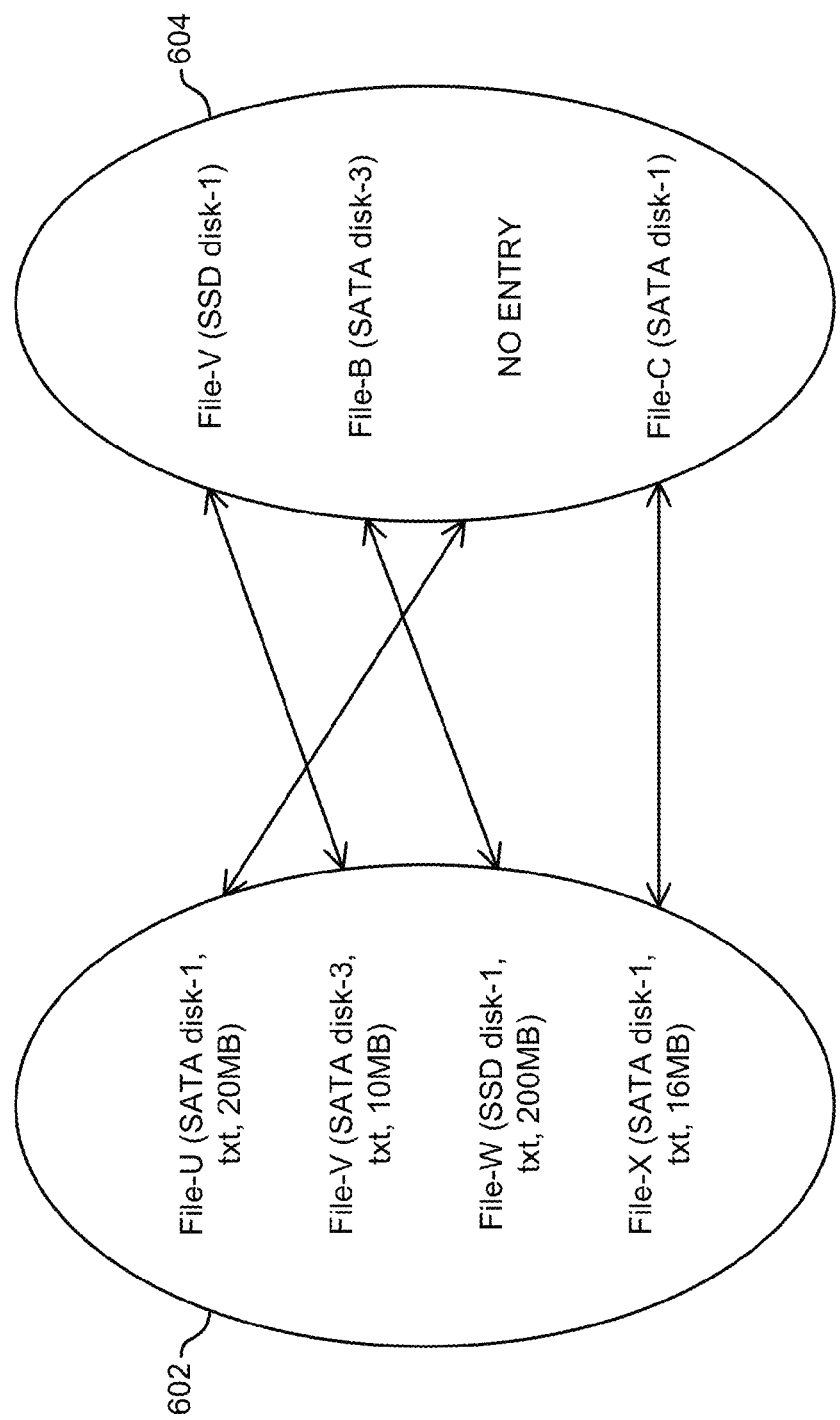
FIGS. 6A-6B illustrate a representational view of a map relationship according to one embodiment.
Figure 6B:
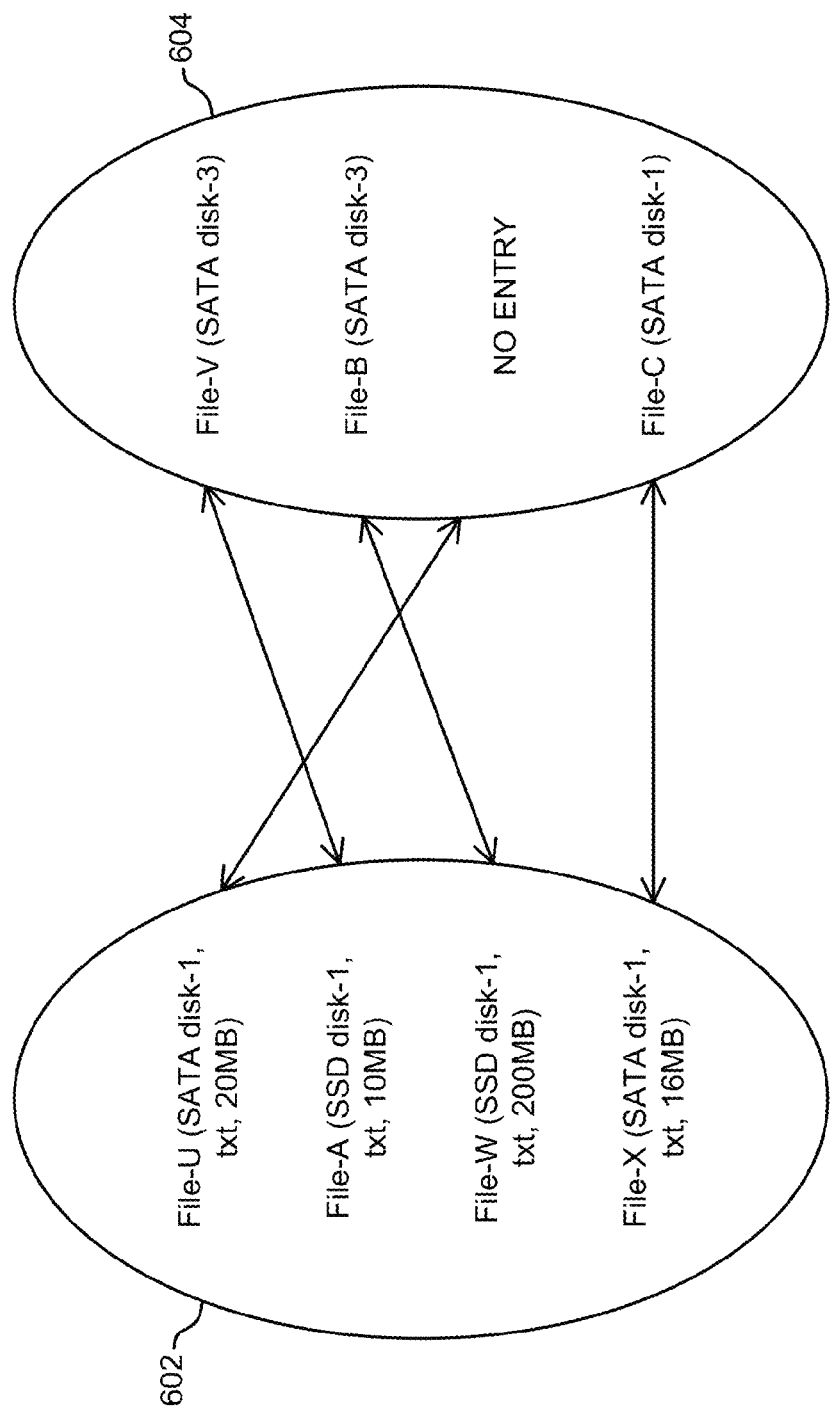

FIG. 6A graphically illustrates an exemplary relationship among original and deduplicated data items (e.g., files), while FIG. 6B graphically illustrates the relationship of the data items of FIG. 6A after a remapping operation. With reference now to the original data items 602 and the deduplicated data items 604 of the map relationship illustrated in FIG. 6A, File-A is stored on SSD memory (higher performance) as a duplicate data item of File-V which is stored on SATA memory (lower performance). Hence, with reference now to FIG. 6B, the deduplication remapping operation performs a remap operation such that File-A is treated as an original data item (i.e. complete file content is stored on SSD memory) and File-V is treated as duplicate data item. As illustrated, the deduplication remapping operation may remove the complete data item content of File-V from SATA memory, and map File-V with a pointer to File-A (e.g., the complete file content) on SSD memory.

The deduplication remapping operation may preferably follow a strategic approach, e.g., that performs deep analysis of deduplicated and original data items, e.g., collected from a deduplication engine and/or file system tables. Moreover, the deduplication remapping operation preferably eliminates QoS violations that would otherwise occur when data items of customers subscribing to higher performance storage tiers have pointers to data on lower performance storage tiers.

Therefore, in one approach, the deduplication remapping operation may be implemented by following a prerequisite procedure, where the deduplication remapping operation forms a set relation among the original data item location, content, size and deduplicated entries location for the original data item by considering the discrimination of back end storage (e.g., SSD memory correspond to higher performance customers and SATA memory correspond to lower performance customers).

Figure 7:
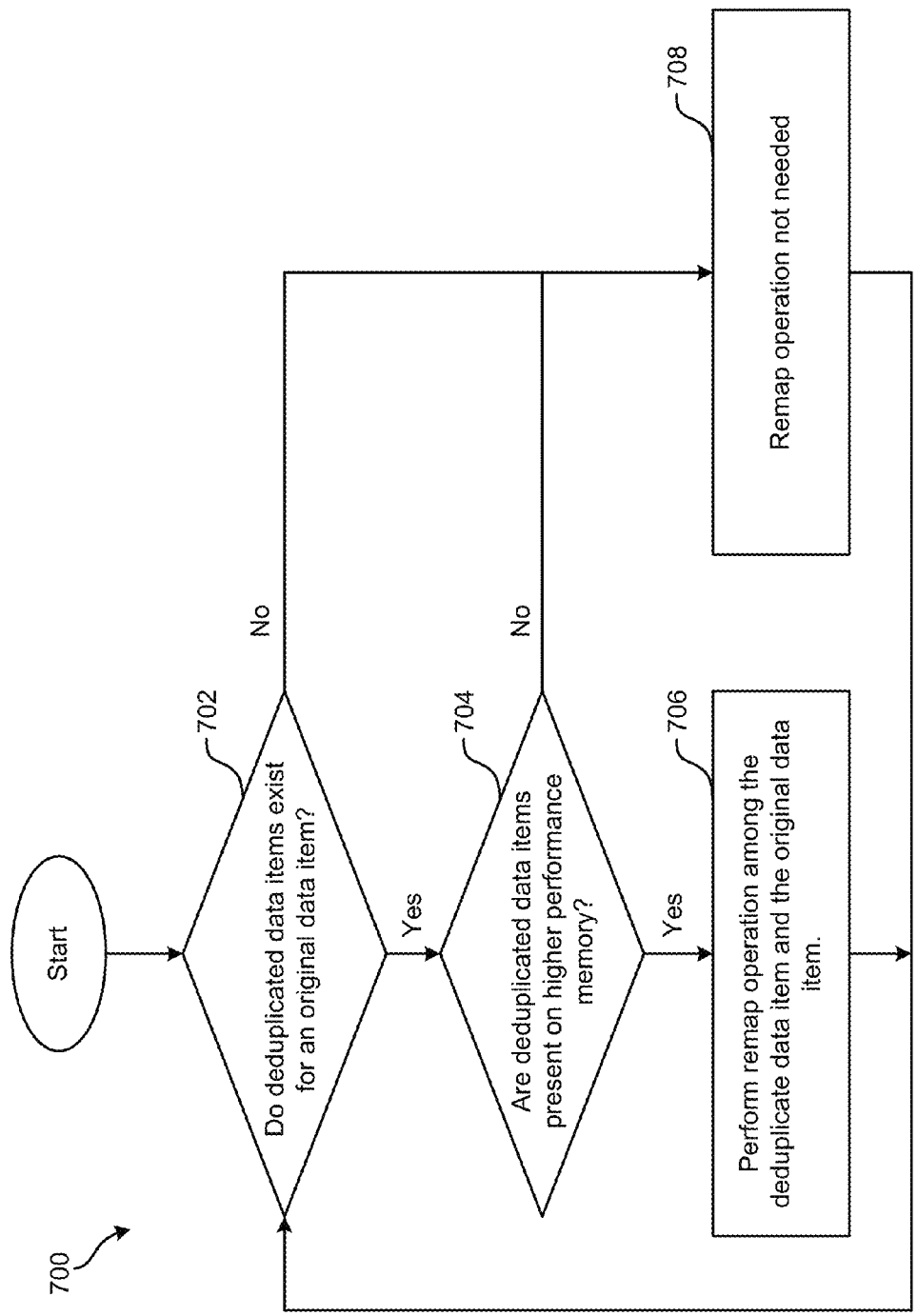
FIG. 7 illustrates a flowchart of a method according to one embodiment.

FIG. 7 depicts an algorithmic flow 700 of a deduplication remapping operation in accordance with one embodiment. As an option, the present method 700 may be implemented in conjunction with features from any other embodiment listed herein, such as those described with reference to the other FIGS. Of course, however, such algorithm 700 and others presented herein may be used in various applications and/or in permutations which may or may not be specifically described in the illustrative embodiments listed herein. Further, the algorithm 700 presented herein may be used in any desired environment. Thus FIG. 7 (and the other FIGS.) should be deemed to include any and all possible permutations.

With reference now to FIG. 7, a determination is made as to whether deduplicated data items exist for an original data item, e.g., for a memory storage system. See operation 702. This may be achieved by performing a lookup from the set relation table (e.g., a lookup table), but is not limited thereto.

If operation 702 determines that deduplicated data items do not exist, step 708 is performed, which concludes there is no need to perform a remap operation. However, if operation 702 determines that deduplicated data items do exist, the process moves to operation 704 which determines whether deduplicated data items are present on higher performance memory, e.g., belonging to a higher performance client.

If operation 704 determines that deduplicated data items are not present on higher performance memory, the process moves to step 708 which concludes there is no need to perform a remap operation. The process may end here, or may be repeated. However, if operation 704 determines that deduplicated data items are present on higher performance memory, the process moves to step 706 which performs a remap operation among the deduplicate data item and the original data item.

In another illustrative embodiment, a system may include a processor and logic, the logic preferably being integrated with and/or executable by the processor. In a preferred approach, the logic may be adapted to perform a deduplication remapping operation so that a data item corresponding to a higher service level, is stored as an original on a higher performance storage tier while duplicates of the data item corresponding to a lower service level exist in a lower performance storage tier at least in part as pointers to the data item on the higher performance storage device. According to one approach, performance may refer at least one part to a relative speed with which the data is returned to the user, a relative speed with which the data can be downloaded from the user, etc.

However, according to various other approaches, the logic may be adapted to perform any of the approaches described and/or suggested herein. Thus, the system should be deemed to include any and all possible permutations.

In a preferred approach, the embodiments described and/or suggested herein maintain a set relationship among the deduplicated data items and original data items, e.g., by considering back end storage discrimination of disks. The deduplication remapping operation preferably performs a lookup on the relation table (e.g., lookup table) and maintains that all data items stored by a higher service level customer are treated as original data entries and are to be placed on a higher performance storage tier. In another approach, data items which are newly generated and/or exiting by lower service level customers and/or are duplicates of files stored by higher service level customer, are preferably mapped with pointer reference to the original data items on the higher performance storage tier.

Moreover, the embodiments described and/or suggested herein may be applied to an existing data storage system that may or may not have previously utilized deduplication and/or ILM. Furthermore, the embodiments described and/or suggested herein may be applied to block deduplication (e.g., parts and/or portions of a file) and/or file deduplication (e.g., whole files), but is not limited thereto.

It will be clear that the various features of the foregoing embodiments may be combined in any way, creating a plurality of combinations from the descriptions presented above.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product for ensuring compliance of service levels corresponding to file-system operations in a deduplicated, tiered storage system comprising storage devices of varying performance levels, each of the performance levels being associated with at least one service level, the computer program product comprising a non-transitory computer readable storage medium having program code embodied therewith, the program code readable/executable by a processor to:
    perform a deduplication remapping operation, by the processor, so that a data item corresponding to a higher service level is stored as an original data item on a higher performance storage tier while duplicates of the data item corresponding to a lower service level are physically stored in a lower performance storage tier at least in part as pointers to the original data item on the higher performance storage tier;
    receive, by the processor, a modification to the original data item on the higher performance storage tier;
    store, by the processor, a modified copy of the original data item as a new data item on the higher performance storage tier;
    retain, by the processor, the original data item on the higher performance storage tier for a period of time;
    maintain, by the processor, the pointers from the duplicates to the original data item for the period of time;
    make, by the processor, an entry of the modified copy of the original data item to a relational set;
    enable, by the processor, direct saving of the modified copy of the original data item;
    transfer, by the processor, the original data item from the higher performance storage tier to the lower performance storage tier after the period of time and at a statistically identified low load time thereby replacing the duplicates on the lower performance storage tier;
    delete, by the processor, the original data item from the higher performance storage tier after the transferring;
    analyze, by the processor, data item entries and a service level associated with each of the entries; and
    perform, by the processor, the deduplication remapping operation to move data items from the lower performance storage tier to the higher performance storage tier when the data items are associated with the higher service level,
    wherein the deduplication remapping operation includes:
        receiving the data item;
        determining a service level associated with the data item;
        storing the received data item as an original on the higher performance storage tier in response to determining that the data item corresponds to the higher service level and in response to determining that the data item does not form a duplicate to any data item stored on the lower performance storage tier;
        mapping at least a portion of subsequently received duplicate data items to the received data item stored on the higher performance storage tier in response to storing the received data item as an original on the higher performance storage tier, wherein the subsequently received duplicate data items correspond to a lower service level and exist on the lower performance storage tier;
        storing the received data item as an original on the lower performance storage tier in response to determining that the data item corresponds to the lower service level and in response to determining that the data item does not form a duplicate to any data item stored on the higher performance storage tier; and
        mapping at least a portion of the received data item to subsequently received duplicate data items stored on the higher performance storage tier in response to storing the received data item as an original on the lower performance storage tier, wherein the subsequently received duplicate data items correspond to the higher service level and exist on the higher performance storage tier.

2. The computer program product of claim 1, wherein the higher service level is associated with a higher subscription cost than the lower service level.

3. The computer program product of claim 1, wherein the computer program product ensures compliance of service levels corresponding to file-system operations in a deduplicated, tiered storage system comprising storage devices of varying performance levels, each of the performance levels being associated with at least one service level, wherein the deduplication remapping operation includes receiving the data item, the data item corresponding to the higher service level, determining that a duplicate of the data item is present in the lower performance storage tier, storing the received data item in the higher performance storage tier, marking the stored data item on the higher performance storage tier as an original, mapping at least a portion of the duplicate data item to the stored data item on the higher performance storage tier.

4. The computer program product of claim 1, wherein the program code is further readable/executable by the processor to receive a modification to the data item on the higher performance storage tier; store the modified data item as a new data item on the higher performance storage tier; transfer the data item from the higher performance storage tier to the lower performance storage tier thereby replacing the duplicate on the lower performance storage tier; and delete the data item from the higher performance storage tier after the transferring.

5. The computer program product of claim 1, wherein the program code is further readable/executable by the processor to detect a request from a user for deletion of the data item from the higher performance storage tier; represent to the user that the data item has been deleted; transfer the data item from the higher performance storage tier to the lower performance storage tier thereby replacing the duplicate on the lower performance storage tier; and delete the data item from the higher performance storage tier after the transferring.

6. The computer program product of claim 1, wherein the program code is further readable/executable by the processor to receive a modification to the duplicate data item on the lower performance storage tier; store the modification on the lower performance storage tier; transfer portions of the data item on the higher performance storage tier that correspond to unmodified portions of the duplicate data item to the lower performance storage tier; store the portions in association with the modification as a new data item.

7. A system, comprising:
a processor and logic integrated with and/or executable by the processor, the logic being configured to:
perform a deduplication remapping operation so that a data item corresponding to a higher service level is stored as an original data item on a higher performance storage tier while duplicates of the data item corresponding to a lower service level are physically stored in a lower performance storage tier at least in part as pointers to the original data item on the higher performance storage tier;
receive, by the processor, a modification to the original data item on the higher performance storage tier;
store, by the processor, a modified copy of the original data item as a new data item on the higher performance storage tier;
retain, by the processor, the original data item on the higher performance storage tier for a period of time;
maintain, by the processor, the pointers from the duplicates to the original data item for the period of time;
make, by the processor, an entry of the modified copy of the original data item to a relational set;
enable, by the processor, direct saving of the modified copy of the original data item;
transfer, by the processor, the original data item from the higher performance storage tier to the lower performance storage tier after the period of time and at a statistically identified low load time thereby replacing the duplicates on the lower performance storage tier;
delete, by the processor, the original data item from the higher performance storage tier after the transferring;
analyze, by the processor, data item entries and a service level associated with each of the entries; and
perform, by the processor, the deduplication remapping operation to move data items from the lower performance storage tier to the higher performance storage tier when the data items are associated with the higher service level,
wherein the deduplication remapping operation includes:
receiving the data item;
determining a service level associated with the data item;
storing the received data item as an original on the higher performance storage tier in response to determining that the data item corresponds to the higher service level and in response to determining that the data item does not form a duplicate to any data item stored on the lower performance storage tier;
mapping at least a portion of subsequently received duplicate data items to the received data item stored on the higher performance storage tier in response to storing the received data item as an original on the higher performance storage tier, wherein the subsequently received duplicate data items correspond to a lower service level and exist on the lower performance storage tier;
storing the received data item as an original on the lower performance storage tier in response to determining that the data item corresponds to the lower service level and in response to determining that the data item does not form a duplicate to any data item stored on the higher performance storage tier; and
mapping at least a portion of the received data item to subsequently received duplicate data items stored on the higher performance storage tier in response to storing the received data item as an original on the lower performance storage tier, wherein the subsequently received duplicate data items correspond to the higher service level and exist on the higher performance storage tier.

8. The system as recited in claim 7, wherein the higher service level is associated with a higher subscription cost than the lower service level.

9. The system as recited in claim 7, wherein the deduplication remapping operation includes receiving the data item, the data item corresponding to the higher service level, determining that a duplicate of the data item is present in the lower performance storage tier, storing the received data item in the higher performance storage tier, marking the stored data item on the higher performance storage tier as an original, mapping at least a portion of the duplicate data item to the stored data item on the higher performance storage tier.

10. The system as recited in claim 7, comprising logic configured to: detect a request from a user for deletion of the data item from the higher performance storage tier; represent to the user that the data item has been deleted; transfer the data item from the higher performance storage tier to the lower performance storage tier thereby replacing the duplicate on the lower performance storage tier; and delete the data item from the higher performance storage tier after the transferring.

11. The system as recited in claim 7, comprising logic configured to: receive a modification to the duplicate data item on the lower performance storage tier; store the modification on the lower performance storage tier; transfer portions of the data item on the higher performance storage tier that correspond to unmodified portions of the duplicate data item to the lower performance storage tier; store the portions in association with the modification as a new data item.

12. A computer-implemented method for ensuring compliance of service levels corresponding to file-system operations in a deduplicated, tiered storage system comprising storage devices of varying performance levels, each of the performance levels being associated with at least one service level, the method comprising:
performing, by a computer, a deduplication remapping operation so that a data item corresponding to a higher service level is stored as an original data item on a higher performance storage tier while duplicates of the data item corresponding to a lower service level are physically stored in a lower performance storage tier at least in part as pointers to the original data item on the higher performance storage tier;
receiving, by the computer, a modification to the original data item on the higher performance storage tier;

storing, by the computer, a modified copy of the original data item as a new data item on the higher performance storage tier;

retaining, by the computer, the original data item on the higher performance storage tier for a period of time;

maintaining, by the computer, the pointers from the duplicates to the original data item for the period of time;

making, by the computer, an entry of the modified copy of the original data item to a relational set;

enabling, by the computer, direct saving of the modified copy of the original data item;

transferring, by the computer, the original data item from the higher performance storage tier to the lower performance storage tier after the period of time and at a statistically identified low load time thereby replacing the duplicates on the lower performance storage tier;

deleting, by the computer, the original data item from the higher performance storage tier after the transferring;

analyzing, by the computer, data item entries and a service level associated with each of the entries; and performing, by the computer, the deduplication remapping operation to move data items from the lower performance storage tier to the higher performance storage tier when the data items are associated with the higher service level, wherein the deduplication remapping operation includes:
  receiving the data item;
  determining a service level associated with the data item;
  storing the received data item as an original on the higher performance storage tier in response to determining that the data item corresponds to the higher service level and in response to determining that the data item does not form a duplicate to any data item stored on the lower performance storage tier;
  mapping at least a portion of subsequently received duplicate data items to the received data item stored on the higher performance storage tier in response to storing the received data item as an original on the higher performance storage tier, wherein the subsequently received duplicate data items correspond to a lower service level and exist on the lower performance storage tier;
  storing the received data item as an original on the lower performance storage tier in response to determining that the data item corresponds to the lower service level and in response to determining that the data item does not form a duplicate to any data item stored on the higher performance storage tier; and
  mapping at least a portion of the received data item to subsequently received duplicate data items stored on the higher performance storage tier in response to storing the received data item as an original on the lower performance storage tier, wherein the subsequently received duplicate data items correspond to the higher service level and exist on the higher performance storage tier.

13. The method as recited in claim 12, with a proviso that a data item corresponding to the higher service level is not stored as a reference to a duplicate data item on the lower performance storage tier, wherein the higher service level is associated with a higher subscription cost than the lower service level.

14. The method as recited in claim 12, wherein the deduplication remapping operation includes receiving the data item, the data item corresponding to the higher service level, determining that a duplicate of the data item is present in the lower performance storage tier, storing the received data item in the higher performance storage tier, marking the stored data item on the higher performance storage tier as an original, mapping at least a portion of the duplicate data item to the stored data item on the higher performance storage tier using the pointers.

15. The method as recited in claim 12, comprising receiving a modification to the data item on the higher performance storage tier; storing the modified data item as a new data item on the higher performance storage tier; transferring the data item from the higher performance storage tier to the lower performance storage tier thereby replacing the duplicate on the lower performance storage tier; and deleting the data item from the higher performance storage tier after the transferring.

16. The method as recited in claim 12, comprising detecting a request from a user for deletion of the data item from the higher performance storage tier; representing to the user that the data item has been deleted; transferring the data item from the higher performance storage tier to the lower performance storage tier thereby replacing the duplicate on the lower performance storage tier; and deleting the data item from the higher performance storage tier after the transferring.

17. The method as recited in claim 12, comprising receiving a modification to the duplicate data item on the lower performance storage tier; storing the modification on the lower performance storage tier; transferring portions of the data item on the higher performance storage tier that correspond to unmodified portions of the duplicate data item to the lower performance storage tier; storing the portions in association with the modification as a new data item.

* * * * *